United States Patent [19]
Reedy

[11] 3,954,611
[45] May 4, 1976

[54] PORTABLE APPARATUS AND METHOD FOR PURIFYING LUBRICATING OIL IN VARIOUS DEVICES

[76] Inventor: Elvie L. Reedy, 3617 London Lane, Fort Worth, Tex. 76118

[22] Filed: Jan. 29, 1975

[21] Appl. No.: 545,085

[52] U.S. Cl. .................................. 210/71; 184/1.5; 210/73 W; 210/168; 210/171; 210/182; 210/195 R; 210/223; 210/241; 210/252; 210/295
[51] Int. Cl.² ........................................ B01D 17/04
[58] Field of Search .................. 184/1.5, 6.22, 6.24, 184/6.25; 210/71, 73 OW, 84, 168, 171, 172, 181, 182, 195 R, 223, 241, 252, 257, 259, 295, 416 D, 512 R

[56] References Cited
UNITED STATES PATENTS

| | | | |
|---|---|---|---|
| 1,962,463 | 6/1934 | Renfrew | 210/181 X |
| 2,149,764 | 3/1939 | Frei | 210/223 |
| 2,479,139 | 8/1949 | Seigel | 184/1.5 |
| 2,583,522 | 1/1952 | Winslow et al. | 210/223 |
| 2,665,772 | 1/1954 | Greer et al. | 184/1.5 |
| 2,685,347 | 8/1954 | Busby | 210/241 X |
| 2,738,877 | 3/1956 | Beach | 210/259 X |
| 2,820,528 | 1/1958 | Harper | 184/1.5 |
| 2,895,883 | 7/1959 | Hobson | 210/168 X |
| 3,029,898 | 4/1962 | Fraser | 184/1.5 |
| 3,164,551 | 1/1965 | Nugent | 210/223 |
| 3,810,487 | 5/1974 | Cable et al. | 184/1.5 X |

*Primary Examiner*—Charles N. Hart
*Assistant Examiner*—Robert G. Mukai
*Attorney, Agent, or Firm*—Richards, Harris & Medlock

[57] ABSTRACT

Disclosed is a portable apparatus and method for purifying lubricating oil in remotely separated devices, such as gearboxes and motors on oil well pumping equipment. The apparatus is mounted on a vehicle, such as a trailer, and has separate tanks thereon for holding volumes of oil. A flexible conduit on the apparatus is provided for selective connection to a device. Pump means are provided for removing the lubrication oil from the device and pumping it into one of the tanks on the apparatus. A liquid heater is provided in the apparatus for selective connection to the tanks. Appropriate valve and pump means are associated with the heater for use in circulating the oil through the heater to raise the temperature to between 150° and 175° F. A filtering apparatus is provided with appropriate valves and pump means for cleaning the heated oil. The filtering apparatus has in series a magnetic filter for removing metal particles from the oil, a screen for removing particles from the oil; a centrifuge for separating water and solids from the oil; and a cellulose fiber filter for removing the finer particles from the oil. A discharge conduit is provided for selective connection to the device for injecting clean oil to the gearbox. A reservoir of new oil is provided on the vehicle for selective connection to the system to supply additional oil which can be dispensed into the device. A power supply is provided on the vehicle to supply power for the various elements of the system.

4 Claims, 7 Drawing Figures

PORTABLE APPARATUS AND METHOD FOR PURIFYING LUBRICATING OIL IN VARIOUS DEVICES

BACKGROUND AND SUMMARY OF THE INVENTION

The present invention relates generally to an improved method and apparatus for purification of oil at a plurality of remotely located devices, such as, gearboxes and motors on oil well pumping equipment. More particularly, a new and improved apparatus is disclosed which is mounted on a vehicle and can be moved adjacent to a remotely located container such as, gearboxes of oil well pumping equipment. The apparatus operate to remove the oil from the gearbox, flush the gearbox, clean the oil, and return the cleaned oil to the gearbox. In addition, the improved method of the present invention comprises the step of cleaning the oil at a temperature of between 150° to 175° whereby the temperature dues not get so high as to disturb the refinery blend of additives.

In the production of oil, it is common to have a plurality of wells separated geographically. Oil is lifted from each well by separate oil pumps having a walking beam which is driven by a gearbox and motor. The gearbox is conventionally sealed and has a quantity of oil therein suitable for lubricating the bearings, gears, and other moving parts therein.

To achieve maximum production from each well, it is extremely important to maintain this pumping equipment and the gearboxes thereon in an efficient and workable condition as it is quite difficult to repair or replace damaged gearboxes. In addition, the remote locations of these wells makes servicing extremely difficult.

Therefore, according to the present invention, an improved apparatus and method is provided for servicing the gearboxes to greatly extend the life expectancy of the equipment and reduce downtime.

In accordance with the present invention, a service apparatus is provided on a vehicle which can be moved from well to well to service the gearboxes thereon. The apparatus is provided with a plurality of tanks, valves, and pumps for removing the dirty oil from the gearbox, heating the oil to a temperature between 150° to 175° F., whereby the oil can be cleaned by moving it through a filter system which includes, in series, a magnetic filter, a screen, a centrifuge, and a fine filter. The oil can then be stored on the vehicle to be returned to a gearbox when it is needed. Provision is also made for adding new oil to replace oil loss from the gearbox and for flushing the gearbox.

DESCRIPTION OF THE DRAWINGS

A more complete understanding of the advantages and objects of the present invention will become apparent from the following detailed description when considered in connection with the accompanying Drawings in which.

DETAILED DESCRIPTION OF THE DRAWINGS

Figure 1:
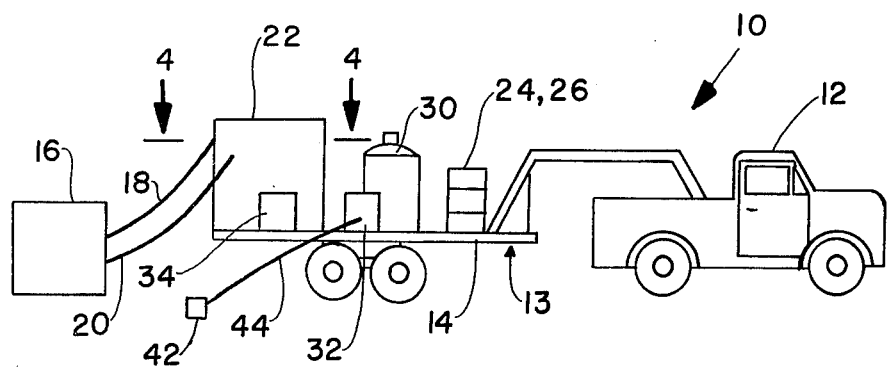
FIG. 1 is a side elevation view of one embodiment of the improved servicing apparatus of the present invention shown connected to an oil well gearbox.

Referring now to the Drawings wherein like reference characters designate like or corresponding parts throughout the several views, there is disclosed an improved apparatus for servicing a plurality of remotely located and geographically separated gearboxes on oil well pumping equipment which, for purposes of description, is designated by reference numeral 10. In the present embodiment, the apparatus 10 comprises a trailer 13 having a bed 14 with various elements of the apparatus mounted thereon. In FIG. 1, a truck 12 is illustrated connected to the trailer 13 and positioned adjacent to a gearbox 16 which is diagrammatically illustrated. Although the apparatus 10 is illustrated as using a truck 12 to provide mobility, it is understood, of course, that other types of vehicles could be utilized.

For purposes of simplicity, the various conduits interconnecting the elements mounted on the bed 14 are omitted from the drawings.

Figure 2:
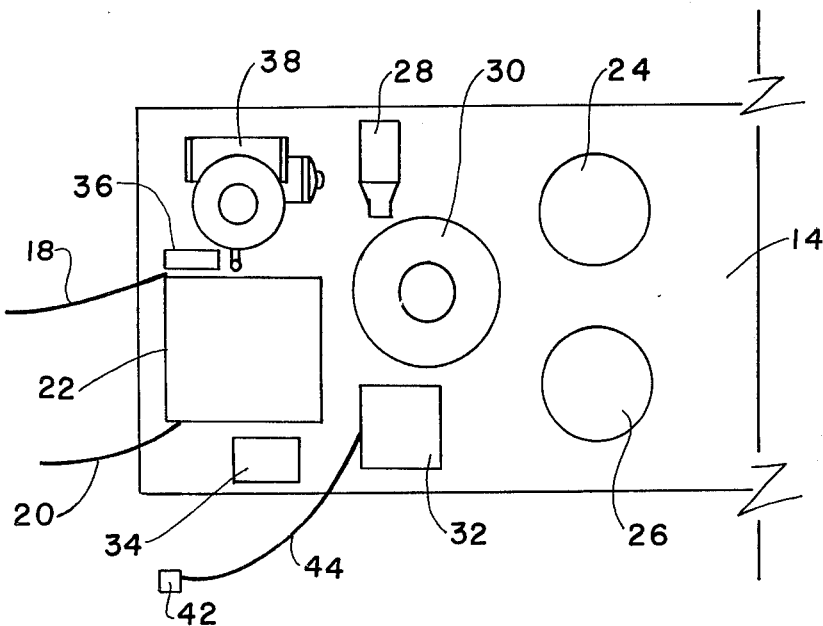
FIG. 2 is a plan view of a portion of the apparatus illustrated in FIG. 1.

As can be seen in FIGS. 1 and 2, the apparatus 10 generally comprises flexible intake and discharge conduits 18 and 20, respectively, a holding tank assembly 22 and auxiliary storage barrels 24 and 26. In addition, a first pump 28, heater 30, electrical power supply 32, second pump 34, first filter assembly 36, and centrifuge assembly 38, and a second filter assembly 40 are provided. In addition, a remote electrical control box 42 is connected to the device by a twenty-five foot extension cable 44 to allow control of the device by an operator located at the gearbox 16.

The plurality of conduits and valves interconnecting the various elements of apparatus 10 is not shown in FIGS. 1 and 2 for purposes of clarity of illustration. The details of this interconnection will be hereinafter described by reference to FIG. 6.

As will be described in detail, the apparatus 10 can be utilized to practice the improved method of the present invention of efficiently servicing a plurality of remotely separated gearboxes for oil well pumps. The apparatus 10 can be operated to remove contaminated or dirty oil from the gearbox 16 through conduit 18 by means of pump 28 and transfer the oil into the holding tank assembly 22. Thereafter, pump 34 can be operated to transfer clean oil from holding tank assembly 22 back into the gearbox 16 through conduit 20. The pump 28 is operated in heating the dirty oil to a temperature of between 150° to 175° F. by circulating the oil through the heater 30. By raising the dirty oil temperature to this range, the viscosity is lowered, thus making the cleaning of the oil more efficient. Once the desired temperature has been reached, the oil can be pumped successfully through a magnetic filter, screen, centrifuge, and fine particle filter to clean the oil. The process can be repeated as desired until the oil is of the desired quality.

In addition, the pump 28 can be operated to heat the clean oil to a temperature of between 150° to 175° F.

by circulating the oil through heater 30. In addition, provisions are made for adding new oil from one of the auxiliary storage barrels 24 and 26, and for flushing the gearbox 16 with clean oil.

Figure 3:
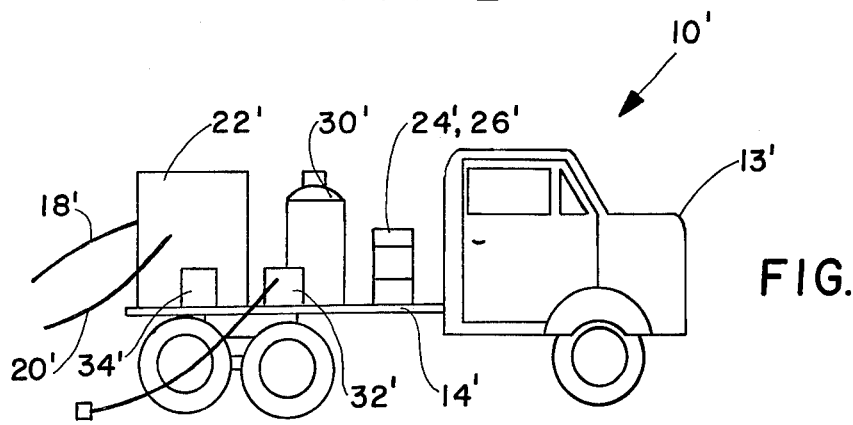
FIG. 3 is a view similar to FIG. 1 of an alternative embodiment of the invention.

An alternative embodiment of the apparatus 10' is illustrated in FIG. 3. In this embodiment, the bed 14' of the truck 13' is used to support and transport the various elements of the apparatus to the wells. In this embodiment, the intake and discharge conduits 18' and 20', holding tank assembly 22', auxiliary storage barrels 24' and 26', heater 30', power suppply 32' and pump 34', are shown on the bed 14'. The filter assembly, centrifuge and intake pump are not shown, but it is to be understood that they form a part of the system.

Figure 4:
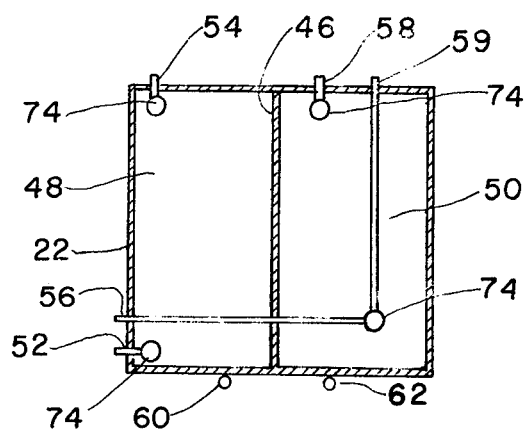
FIG. 4 is a partial section of the holding tank assembly, taken on lines 4—4 of FIG. 1, looking in the direction of the arrows.
Figure 5:
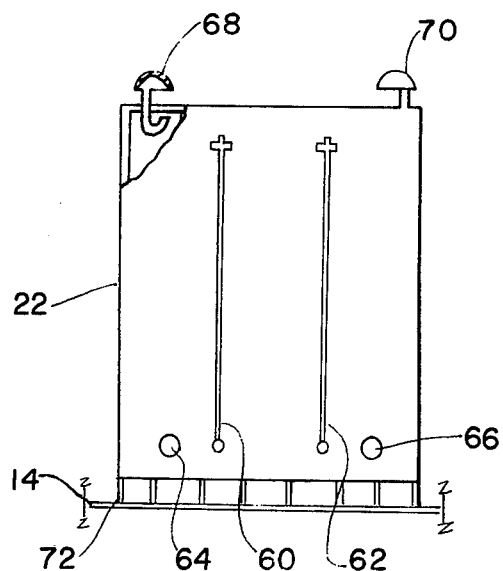
FIG. 5 is a rear elevation view of the holding tank assembly of the present invention.

The details of the construction of the holding tank assembly 22 are illustrated in FIGS. 4 and 5. In FIG. 4, the holding tank assembly is shown as comprising a dirty oil tank 48 and a clean oil tank 50, having exterior walls and an interior wall 46 separating the assembly 22. The dirty oil tank 48 has fluid intake and discharge ports 52 and 54, which communicate with the interior of the tank. A conduit 56 extends through the wall of the tank 48 and through the interior wall 46 to communicate with the interior of the clean oil tank 50. Ports 58 and 59 also communicate with the interior of the tank 50.

In FIG. 5, it can be seen that stand pipes 60 and 62 are provided for the tanks 48 and 50, respectively, to indicate the fluid level therein. Temperature gauges 64 and 66 are provided on tanks 48 and 50, for respectively indicating the temperature of the fluid in tanks. Vents 68 and 70 are provided to equalize the pressure of the interior of the tanks 48 and 50, respectively, as fluid is injected into and discharged from the tanks.

In the preferred embodiments, the holding tank assembly is constructed from sheet metal and has cross-sectional dimensions of 36 in. × 40 in. and is 4 ft. high. The tanks 48 and 50 are of equal size with each holding 2.96 barrels when filled to 40 inches. In addition, in the preferred embodiment, the assembly 22 is 3 inches above the bed 14 by a plurality of ribs 72 spaced 6 inches apart and running front to back along the length. These ribs 72 provide air cooling flow under the tank 22. In addition, if desired, suction covers 74 can be provided inside of the tanks at the fluid intake and discharge openings.

Figure 6:
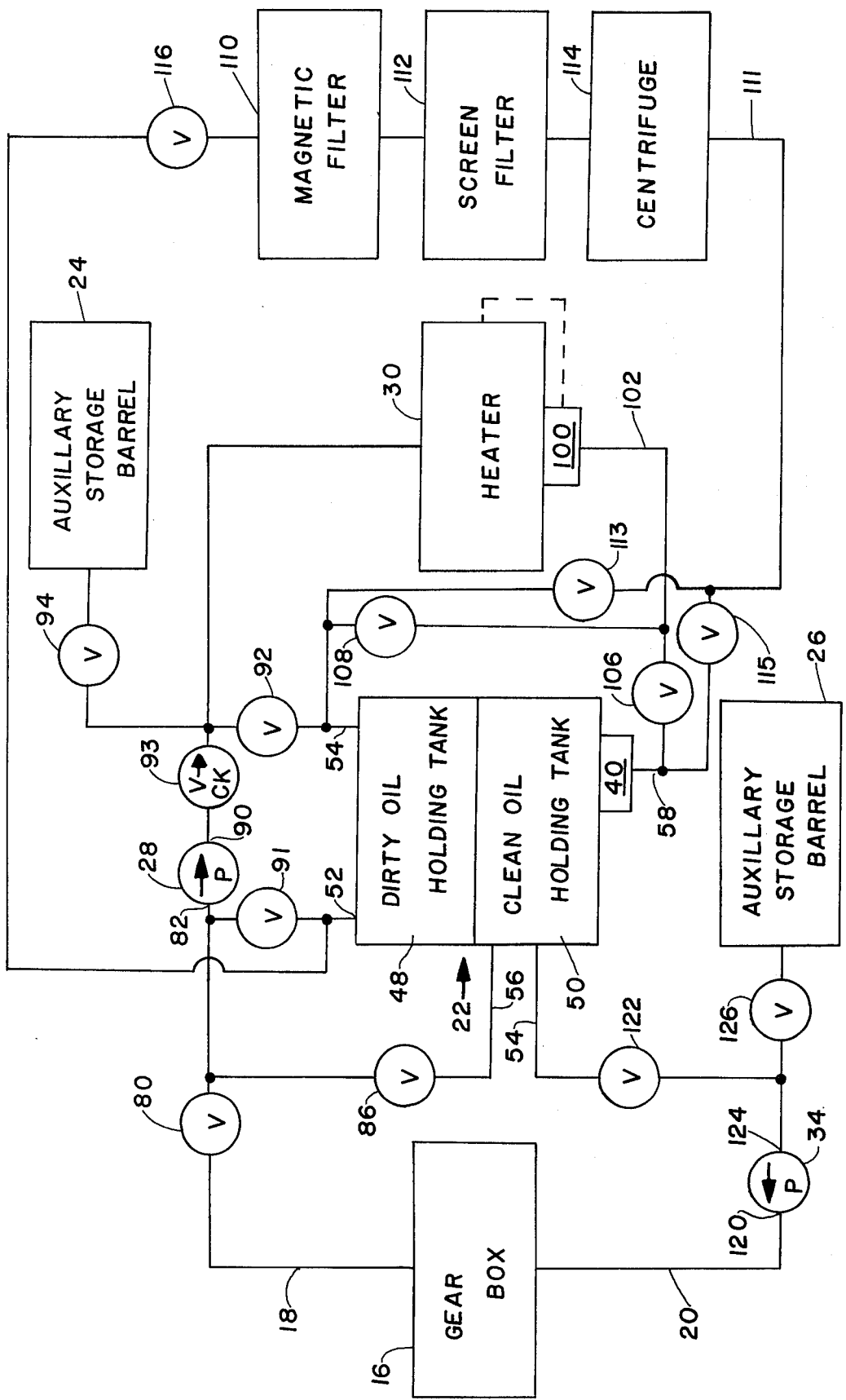
FIG. 6 is a diagrammatic view illustrating the interconnection of the various elements as the system of the present invention.

Turning now to FIG. 6, the interconnection of the various elements of the apparatus 10 will be described in detail. The intake conduit 18 is connected to a shutoff valve 80 provided on the apparatus. The valve 80 is in turn connected to the intake 82 of pump 28. The clean oil tank conduit 56 is also connected to intake 82 through a shutoff valve 86. The dirty oil tank port 52 is connected through shutoff valve 91 to intake 82. Thus, by appropriately openings and closing valves 80, 86 and 91, pump 28 can be utilized to pump oil, respectively, from gearbox 16, clean oil tank 50 and dirty oil tank 48.

The discharge 90 of pump 28 is connected through check valve 93 to the heater 30. The port 54 on the dirty oil tank 38 is connected to discharge 90 through a shutoff valve 92 and check valve 93. The auxiliary storage barrel 24 is connected to discharge 90 through a shutoff valve 94 and check valve 93. The discharge from the heater 30 is connected by means of a conduit 102 to a thermostat element 100 positioned in the flow of liquid.

Port 58 on the clean oil tank 50 is connected through filter 40 and shutoff valve 106, to the conduit 102. The port 54 on the dirty oil tank 48 is likewise connected through a shutoff valve 108 to the conduit 102. Thus, by selectively opening and closing the valves 92, 94, 106, and 108, the flow discharge from the pump 28 can be caused to flow either into the dirty oil tank 48, into auxiliary storage barrel 24, through the heater 30, and in turn, either into the dirty oil tank 48, or into the clean oil tank 50. Thus, either the oil in tank 48 or 50 can be heated.

The intake port of magnetic filter 110 is connected through the shutoff valve 116 to port 52. The discharge of filter 110 is connected to screen 112, which in turn, is connected to centrifuge 114. The discharge from centrifuge is connected to a conduit 111. Conduit 111 is connected to port 54 on the dirty oil holding tank 48 through shutoff valve 113. Conduit 111 is likewise connected to port 58 on the clean oil holding tank 50 through shutoff valve 115. Thus, by opening valves 116 and 115, and operating centrifuge 114, the pumps in centrifuge 114 will cause the oil in dirty oil tank 48 to be passed successively through magnetic filter 110, screen 112, centrifuge 114, filter 40 and into the clean oil tank 50.

The centrifuge 114 is preferably a Model 55 Unimatic Oil Purifier manufactured by DeLaval Separater Company, Poughkeepsie, New York. This unit separates solids, water and sludge from the oil. By heating the oil as disclosed, the viscosity is decreased thus, increasing the efficiency of the centrifuge operation. The centrifuge 114 has internal suction and discharge pumps for moving the oil therethrough.

The filter 40 is preferably a pleated cellulose filter allowing only liquid and particles smaller than 3 microns to pass therethrough. In the preferred embodiment, a filter part No. LFT-2K3-PPY2, manufactured by Schroeder Brothers Corporation, of McKees Rocks, Pa., was used.

The discharge 120 of the pump 34 is connected to the conduit 20. The port 59 of tank 50 is connected through shutoff valve 122 to the intake 124 of pump 34. In addition, auxiliary storage barrel 26 is connected through valve 126 to intake 124 of pump 34. By opening valve 122, and operating pump 34, oil in clean oil tank 50 can be transferred to the gearbox 16. Similarly, the oil in storage barrel 26 can be transferred to the gearbox 16 as acquired by opening valve 126 and operating pump 34.

Figure 7:
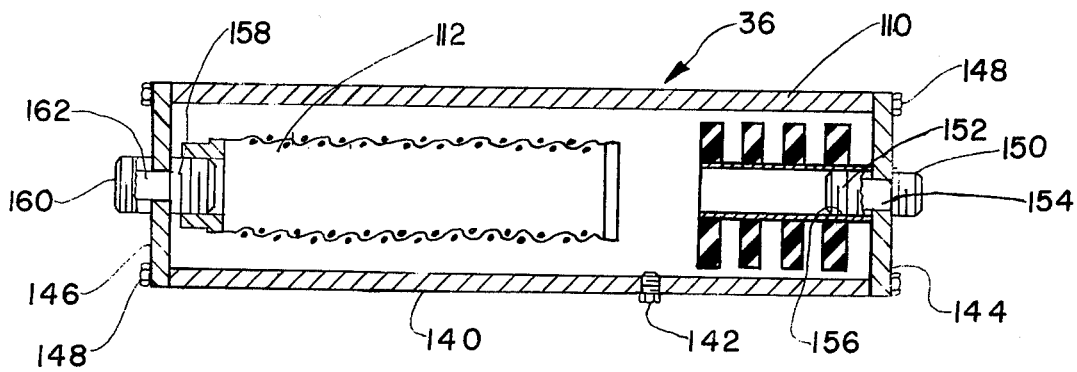
FIG. 7 is a longitudinal section of the filter assembly of the present invention.

The filter assembly 36 is illustrated in detail in FIG. 7. The assembly comprises a cylindrical body 140 which preferably has a six inch internal diameter and is of sufficient length to accommodate a screen filter and a magnetic filter therein. The body 140 is preferably tapped at one point to accommodate a threaded drain plug 142. The ends of the body 140 are closed by circular end plates 144 and 146, which are attached to the body 140 by suitable fasteners 148.

The end plate 144 has short lengths of externally threaded tubing 150 and 152 welded on either side of a central port 154. The externally extending tubing 150 is provided to allow connection of the assembly 36 to the system, while internally extending tubing 152 allows mounting of a magnetic filter 110 in the chamber of body 140. The magnetic filter 110 has a threaded through bore 156 which is threaded onto the externally threaded tubing 152. Thus, oil flowing in through tubing 150, port 154, and tubing 152 will pass through the interior of bore 156 before entering the chamber of body 140. The natural magnetics in magnetic filter 110 will remove metallic particles from the oil flow therethrough.

The end plate 146 has short lengths of tubing 158 and 160 welded on either side of a central port 162. The externally extending tubing 160 is for connection of the assembly 36 to the system, while internally extending tubing 158 supports an internally threaded screen filter 112. The flow leaving the chamber in body 140 must flow through filter 120 before passing through tubing 160.

In the preferred embodiment, the filter 112 is a 100 mesh monel wire cloth element, manufactured by General Filter, Inc. of Novi, Mich. and has part number 4400-S.

OPERATION OF THE SYSTEM

The advantages and features of the servicing apparatus of the present invention will become more apparent by considering the operation of the device in reference to FIG. 6.

In accordance with the approved method of the present invention, the apparatus, whether it be the embodiment 10 with truck 12 or trailer 13 attached thereto, as illustrated in FIGS. 1 and 2, or whether it be the embodiment 10' with truck 13', illustrated in FIG. 3, is moved adjacent to a gearbox 16. The conduit 18 is connected to the gearbox to remove the dirty lubricating oil from the gearbox 16. Once the conduit 18 is connected, valves 80 and 92 are opened and the pump 28 is operated to pump oil from the gearbox 16 into the dirty oil holding tank 48. Once the oil is removed from the gearbox 16, the pump 28 is de-energized.

Thereafter, the valve 122 can be opened and the pump 34 energized and conduit 20 used to spray heated clean oil from clean oil holding tank 50 into the gearbox 16 to clean off the mechanical elements in the gearbox 16. This heated oil from clean oil tank 50 will assist in dissolving any sludge or buildup on the elements in the gearbox 16. Once this flushing process is complete, the pump 34 is de-energized. Next, the pump 28 can be re-energized to remove any accumulation of oil from the gearbox 16 which may have been injected in the flushing process. Once this additional oil is removed, the pump 28 is de-energized.

Next, the gearbox 16 can be refilled with clean oil from the tank 50. To accomplish this, the pump 34 is energized to pump oil into the gearbox 16 through conduit 20.

During the above steps, operation of the apparatus 10 is accomplished through control box 42 to allow the operator to view the interior of the gearbox during the process. Once the gearbox is filled with clean oil, the conduits 18 and 20 are disconnected, the pump 34 is de-energized.

The apparatus 10 can then be removed to another oil well where a separate gearbox 16 can be serviced by repeating the above described process. This process is repeated until the oil in the cleaan oil tank 50 is depleted. Theoretically, at this point, the dirty oil tank 48 should be filled with dirty oil since the volume of oil removed from gearboxes 16 should closely approximate the oil removed from the clean oil tank 50.

Once the clean oil tank is depleted and the dirty oil tank filled, the oil cleaning step is begun. The first step in cleaning the dirty oil in tank 48 is to bring the oil to a temperature in the range between 150° to 175° F. This is accomplished by closing valve 80, opening valve 91, energizing pump 28 and opening valve 108. Thus, the dirty oil is circulated from tank 48 out through port 52, pump 28, heater 30, thermostat 100, conduit 102, and valve 108 and back into the dirty oil tank 48 through port 54. This heating step is continued until the oil in tank 48 reaches the temperature in the range described. This can be determined by viewing the temperature gauge 64 on tank 48. In addition, the heater 30 is supplied with a conventional thermostat 100, which senses the temperature of the oil, leaving the heater 30, and will disengage the heater 30 upon reaching 175° F. to prevent over heating and will reconnect the heater at approximately 165° F. The heater 30 is of a conventional type and utilizes a butane fuel which can be provided on the apparatus 10 in the small tank.

Once the oil in the dirty oil tank 48 reaches the desired temperature, the valves 116 and 113 are opened, and the valve 91 is closed to start the oil cleaning step. With the valves set as described above, the oil will flow from the dirty oil tank 48 through valve 116, magnetic filter 110, screen filter 112, centrifuge 114 (pulled by centrifuge suction pump), valve 113 and be returned to the dirty oil tank 48. This process is continued until the conduit circuit containing the filters and centrifuge is completely purged into the dirty oil tank 48. Once purging is completed, valve 115 is opened and valve 113 is closed. This step continues until all the oil in the dirty oil tank 48 moves through the filter system and into the clean oil tank 50. When the cleaning step is completed, the valves 116 and 115 are closed, and the centrifuge 114 is de-energized.

Thereafter, the clean oil in tank 50 can be transferred to gearbox 16 through valve 122 by energizing pump 34.

In addition, when new oil is required, an auxiliary supply in storage barrel 26 is provided and coupled to the intake 124 of pump 34 through valve 126. By opening valve 126, closing valve 122 and operating pump 34, oil from the auxiliary storage barrel 26 can be transferred to the gearbox 16 through conduit 20.

In addition, when extra storage is required for dirty oil, the pump 28 can be operated and valve 94 opened to pump oil into the auxiliary storage barrel 24 as required.

In accordance with a particular feature of the invention, the apparatus is also suitable for heating the oil in the clean oil tank 50. Heating of the oil in clean oil holding tank 50 can be accomplished by opening valves 86 and 106 and operating pump 28. This will cause the oil to flow from the clean oil tank 50 through conduit 56, valve 86, pump 28, heater 30, thermostat 100, conduit 102, valve 106, filter 40 and back into the clean oil tank 50. The temperature in the clean oil tank can be determined by viewing the temperature gauge 66 thereon.

By providing the improved system and method as disclosed herein, the process of cleaning the dirty oil is performed in a range of temperature such that the factory blend of the oil is not destroyed and such that cleaning is accommodated.

It is to be understood, of course, that the present invention could be practiced by those of ordinary skill in the art without departing from the spirit and scope of the present invention as defined in the appended claims.

I claim:

1. A method of purification of lubricating oil in devices such as pumping units, gearboxes, or the like at geographically separated locations comprising the steps of:

moving a mobile service unit to a device and servicing the device as follows: connecting a hose to the device, next removing the oil from the device through said hose and transferring the oil to a dirty oil holding tank, next flushing the device with heated clean oil from a clean oil holding tank, and filling the device with clean oil from said clean oil holding tank;

moving the unit to and repeating the servicing at other devices;

cleaning the oil accumulated in the dirty oil holding tank and transferring the cleaned oil to the clean oil tank when the oil in the clean oil holding tank is depleted; said cleaning being performed on said mobile unit and comprising heating the oil in said dirty oil holding tank to a temperature between 150° and 175° F., then flowing the oil in the dirty oil holding tank successively through a magnetic filter whereby metallic particles are removed from the oil, through a screen whereby particles are removed from the oil, and centrifuging the oil to remove water and solids from the oil, and flowing the oil through a fine particle filter, and transferring the oil to the clean oil holding tank.

2. An apparatus for purifying lubricating oil in devices such as pumping units, gearboxes, and the like at a plurality of geographically separated locations comprising:

a tank for holding dirty oil;
   a tank for holding clean oil;
   a tank containing new oil;
   a flow-through heater for heating oil;
   control means for operating the heater to heat the oil between 150° and 175° F;
   a filtering system comprising in series, a magnetic filter for removing metallic particles from the oil, a screen for removing particles from the oil, a centrifuge for removing water and solids from the oil, and a fine particle filter for removing smaller particles from the oil;
   pump, valve and conduit means coupling said elements of said system for selective:
   1. connection to and transferring oil from a device to said dirty oil tank;
   2. flowing the oil in said dirty oil tank through said heater whereby the temperature of said oil is raised to a temperature of 150° to 175° F.;
   3. circulating the oil in said dirty oil tank through said filtering system whereby said oil is cleaned;
   4. transferring the oil leaving said filter system to said clean oil tank;
   5. flowing the oil in said clean tank through said heater whereby said oil temperature can be raised to 150° to 175° F.;
   6. connection to and transferring oil from said clean oil tank to said device; and
   7. transferring oil from said new oil tank to said device.

3. The apparatus of claim 2 wherein said screen comprises a 100 mesh wire cloth.

4. The apparatus of claim 2 wherein said fine particle filter comprises means for removing particles 3 microns and larger from the oil.

\* \* \* \* \*

UNITED STATES PATENT OFFICE
CERTIFICATE OF CORRECTION

Patent No. 3,954,611              Dated May 4, 1976

Inventor(s) Elvie L. Reedy

It is certified that error appears in the above-identified patent and that said Letters Patent are hereby corrected as shown below:

Column 1, line 16, after "apparatus" insert --can--.

Column 1, line 21, "dues" should be --does--.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*